US008259565B2

(12) United States Patent
Yang et al.

(10) Patent No.: US 8,259,565 B2
(45) Date of Patent: Sep. 4, 2012

(54) CALL SETUP IN A VIDEO TELEPHONY NETWORK (75) Inventors: Tao Yang, San Diego, CA (US); Nischal Abrol, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 780 days.

(21) Appl. No.: 11/102,212

(22) Filed: Apr. 7, 2005

(65) Prior Publication Data
US 2006/0056416 A1 Mar. 16, 2006

Related U.S. Application Data (60) Provisional application No. 60/611,199, filed on Sep. 16, 2004.

(51) Int. Cl.
*G01R 31/08* (2006.01)
*H04L 12/28* (2006.01)
(52) U.S. Cl. ...... 370/230; 370/231; 370/236; 370/395.2
(58) Field of Classification Search ............... 370/395.2
See application file for complete search history.

(56) References Cited

U.S. PATENT DOCUMENTS

| | | | | |
|---|---|---|---|---|
| 4,920,534 | A * | 4/1990 | Adelmann et al. | 370/474 |
| 5,014,267 | A | 5/1991 | Tompkins et al. | |
| 5,444,718 | A * | 8/1995 | Ejzak et al. | 714/748 |
| 5,768,533 | A | 6/1998 | Ran | |
| 6,694,471 | B1 * | 2/2004 | Sharp | 714/749 |
| 6,760,307 | B2 * | 7/2004 | Dunning et al. | 370/231 |
| 6,768,728 | B1 * | 7/2004 | Kim et al. | 370/342 |
| 6,876,657 | B1 * | 4/2005 | Brewer et al. | 370/394 |
| 7,206,316 | B2 * | 4/2007 | Jabri et al. | 370/410 |
| 7,835,437 | B1 * | 11/2010 | Zhang et al. | 375/240.03 |
| 2002/0191573 | A1 * | 12/2002 | Whitehill et al. | 370/338 |
| 2003/0023746 | A1 | 1/2003 | Loguinov | |
| 2004/0008693 | A1 * | 1/2004 | Grove et al. | 370/395.52 |

(Continued)

FOREIGN PATENT DOCUMENTS

JP 2002171548 6/2002

(Continued)

OTHER PUBLICATIONS

International Search Report and Written Opinion—PCT/US2005/033186, International Search Authority—European Patent Office—Feb. 14, 2006.

*Primary Examiner* — John Blanton
(74) *Attorney, Agent, or Firm* — Kevin T. Cheatham (57) ABSTRACT

This disclosure is directed to techniques for video call setup in a mobile video telephony network. In general, the call setup techniques reduce call setup delays by preemptively retransmitting NSRP packets before expiration of the timeout period ordinarily required for receipt of an NSRP ACK packet from the remote terminal. The retransmitted NSRP packets may be retransmitted during idle periods in which the modem layer in the sending mobile terminal has received no other data for transmission of the remote mobile terminal, thereby taking advantage of idle bandwidth. Multiplex data received by the modem can be locally buffered at the modem layer for retransmission. In this manner, retransmission does not require regeneration of the original call setup messages nor multiplexing. Instead, the previously generated and multiplexed data is buffered at the modem layer for retransmission to reduce processing overhead within the mobile terminal.

42 Claims, 5 Drawing Sheets

U.S. PATENT DOCUMENTS

| | | | |
|---|---|---|---|
| 2004/0100964 A1* | 5/2004 | Robotham et al. | 370/394 |
| 2004/0174817 A1 | 9/2004 | Jabri et al. | |
| 2005/0021678 A1* | 1/2005 | Simyon et al. | 709/219 |
| 2005/0058071 A1* | 3/2005 | Hirashima et al. | 370/235 |
| 2006/0164987 A1* | 7/2006 | Ruiz Floriach et al. | 370/235 |
| 2007/0201409 A1* | 8/2007 | Kandlur et al. | 370/338 |

FOREIGN PATENT DOCUMENTS

| | | |
|---|---|---|
| JP | 2002290442 | 10/2002 |
| JP | 2004040481 | 2/2004 |
| WO | WO9966748 A1 | 12/1999 |
| WO | WO2004010250 | 1/2004 |
| WO | WO2004054221 | 6/2004 |

* cited by examiner

CALL SETUP IN A VIDEO TELEPHONY NETWORK

This application claims the benefit of U.S. Provisional Application No. 60/611,199, filed Sep. 16, 2004, the entire content of which is incorporated herein by reference.

TECHNICAL FIELD

The disclosure relates to video telephony and, more particularly, techniques for call setup in a video telephony network.

BACKGROUND

The 3G-H.324M standard advanced by the International Telecommunication Union (ITU) is an example of a protocol for videoconferencing in a mobile wireless communication network. The 3G-H.324M standard specifies how mobile terminals should handle streaming of audio and video data. The ITU H.245 standard specifies a signaling channel for video call setup. Using H.245 control messages, mobile terminals exchange capabilities and open video, audio and data channels with one another. One or more CODECs handles encoding and decoding of video and audio data for transmission between the mobile terminals to support videoconferencing. The ITU H.223 layer multiplexes and demultiplexes the signaling and data channels.

During H.324M call setup, both mobile terminals indicate their capabilities by exchanging numbered simple retransmit protocol (NSRP) packets containing H.245 call control messages. In general, NSRP is a "stop and wait" protocol in which a terminal sends one packet, waits for acknowledgement from a remote terminal and, only after receiving the acknowledgement, proceeds with transmission of the next NSRP packet. For example, upon receiving an incoming NSRP packet from a sending terminal, a remote terminal will send out an NSRP acknowledgement (ACK) packet to acknowledge to the sending terminal that it indeed received the NSRP packet.

Upon receipt of an NSRP ACK packet, the sending terminal can send out the next NSRP packet and continue with H.324M call setup. If the sending terminal does not receive an NSRP ACK packet within an NSRP timeout period, however, the sending terminal retransmits the previous NSRP packet to the remote terminal. The NSRP ACK packet ensures that H.245 signaling messages are received by the remote terminal, providing guaranteed delivery. However, the "stop and wait" aspect of NSRP can cause undesirable delays during call setup, particularly when the underlying wireless network is error prone and causes a significant number of NSRP packets to be dropped.

SUMMARY

This disclosure is directed to techniques for video call setup in a mobile video telephony network. The techniques may be implemented in a wireless mobile terminal to reduce delays during setup of a videoconferencing call. The call setup techniques may be applicable to H.324M videoconferencing systems, which rely on an H.245 signaling channel for call setup and an H.223 layer multiplexing-demultiplexing (MUX-DEMUX) layer for packaging and transmission of NSRP packets carrying H.245 messages. In general, the call setup techniques described in this disclosure reduce call setup delays by preemptively retransmitting NSRP packets before expiration of the timeout period ordinarily required for receipt of an NSRP ACK packet from the remote terminal.

The retransmission is "preemptive" in the sense that it is not known whether the originally transmitted NSRP packet will actually be dropped. The retransmitted NSRP packets may be retransmitted during "idle" periods in which the modem layer in the sending mobile terminal has received no other data from the H.223 layer for transmission of the remote mobile terminal, thereby taking advantage of idle bandwidth. When an NSRP packet is dropped due to network errors, the retransmitted NSRP packet takes its place. If the original NSRP packet is not dropped, the retransmitted NSRP packet can be discarded.

By preemptively retransmitting the NSRP packet, at least a portion of the delay ordinarily required by the NSRP ACK timeout period for retransmission of NSRP packets can be eliminated. In addition, in some embodiments, multiplex data received from the H.223 layer can be locally buffered at the modem layer for retransmission, e.g., as integrated services digital network (ISDN) packets. In this manner, retransmission of NSRP packets does not require regeneration of the original call setup messages at the H.245 layer, nor multiplexing at the H.223 layer. Instead, the previously generated and multiplexed data is buffered at the modem layer for retransmission to reduce processing overhead within the mobile terminal.

In one embodiment, the disclosure provides a method comprising transmitting a video call setup packet from a first mobile terminal to a second mobile terminal, and retransmitting the video call setup packet before expiration of a timeout period for receipt of an acknowledgement packet from the second mobile terminal.

In another embodiment, the disclosure provides a wireless mobile terminal comprising a wireless transmitter, a wireless receiver, and a modem that generates a video call setup packet for transmission to a second mobile terminal via the transmitter, and submits the video call setup packet for retransmission via the transmitter before expiration of a timeout period for receipt of an acknowledgement packet from the second mobile terminal.

In an additional embodiment, the disclosure provides a computer-readable medium comprising instructions to cause a processor to transmit a video call setup packet from a first mobile terminal to a second mobile terminal, and retransmit the video call setup packet before expiration of a timeout period for receipt of an acknowledgement packet from the second mobile terminal.

The details of various embodiments are set forth in the accompanying drawings and the description below. Other features, objects, and advantages of the invention will be apparent from the description and drawings, and from the claims.

DETAILED DESCRIPTION

Figure 1:
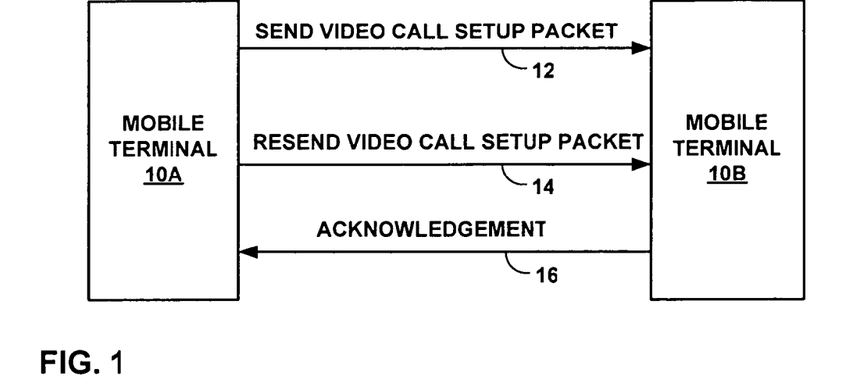
FIG. 1 is a block diagram illustrating a technique for video call setup in a video telephony network.

FIG. 1 is a block diagram illustrating a technique for video call setup in a mobile video telephony network. As shown in FIG. 1, a mobile terminal 10A commences video call setup with a remote mobile terminal 10B by sending a call setup packet (12) to the remote mobile terminal via intermediate wireless network equipment (not shown). In some embodiments, the call setup packet may be an NSRP packet containing H.245 call setup information, and the NSRP packet may be packaged as one or more ISDN packets in the modem layer of mobile terminal 10A.

To reduce call setup delays, in accordance with this disclosure, mobile terminal 10A is configured to preemptively retransmit the call setup packet (14) without waiting for expiration of an NSRP ACK timeout period, provided an NSRP acknowledgement (ACK) packet (16) has not yet been received from remote mobile terminal 10B. The sending mobile terminal 10A may resend the call setup packet during one or more idle periods in which the modem layer of mobile terminal 10A has received no other data from the H.324M stack to send to remote mobile terminal 10B.

The sending mobile terminal 10A does not wait for an NSRP ACK timeout period to expire before resending the call setup packet. Instead, the sending mobile terminal 10A preemptively resends the call setup packet, e.g., when idle bandwidth is available at the modem layer, in anticipation of the possibility that the originally transmitted call setup packet will be dropped due to errors within the video telephony network.

Typical NSRP implementations require expiration of the NSRP ACK timeout period before retransmitting an NSRP packet. The preemptive retransmission of the call setup packet by sending mobile terminal 10A, in accordance with this disclosure, eliminates at least a portion of the delay associated with such a timeout period, and thereby reduces call setup delays within the video telephony network. If the original call setup packet sent by mobile terminal 10A is dropped, i.e., lost in transmission, then the resent call setup packet takes its place. Alternatively, if the original call setup packet is received by remote mobile terminal 10B, in which case an ACK packet may eventually arrive from the remote mobile terminal 10B, the resent call setup packet can be discarded by the remote mobile terminal 10B.

In each case, the sending mobile terminal 10A resends the call setup packet efficiently, using idle bandwidth at the modem layer. In particular, the call setup packet may be sent during idle periods in which the modem layer of the sending mobile terminal 10A has received no new NSRP, audio or video information from the H.324M stack. During call setup, audio and video channels are not yet established. Accordingly, there ordinarily will be no audio or video data available from the H.324M stack during call setup. Also, there will be significant gaps between the NSRP packets due to the inherent stop-and-wait nature of the NSRP implementation.

Hence, there will be idle times in which the modem layer of mobile terminal 10A does not receive any meaningful information from the H.223 layer. Ordinarily, modem 26 would simply add stuffing flags to fill idle portions of ISDN packets sent by mobile terminal 10A. In accordance with this disclosure, however, the idle portions can be exploited to permit efficient retransmission of the call setup packets, in lieu of the stuffing flags, circumventing the typical stop-and-wait requirements of NSRP. By relying on idle bandwidth, retransmission of the call setup packet should have little or no significant adverse impact on the performance of the video telephony network.

Figure 2:
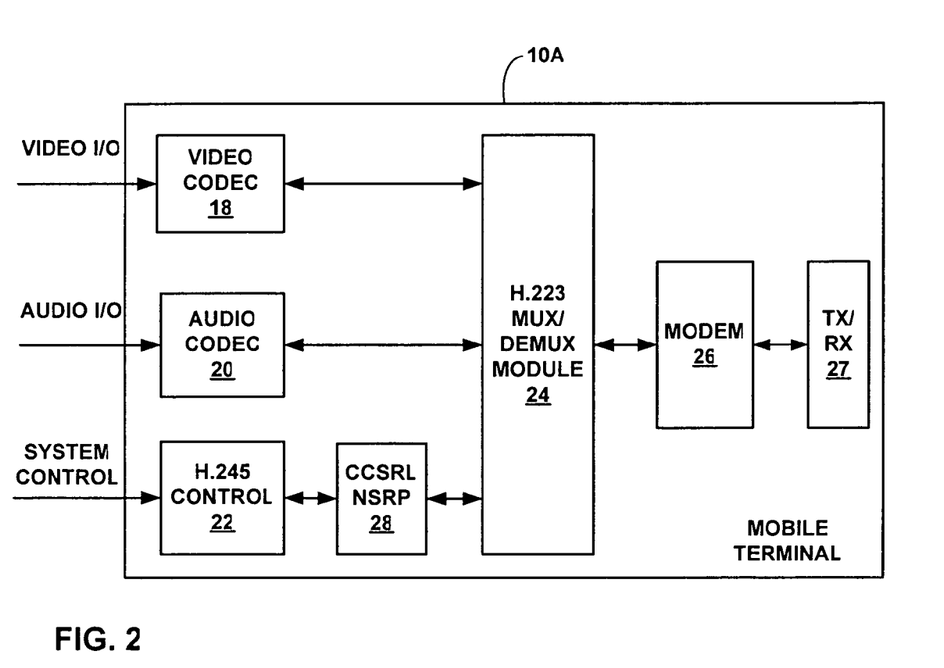
FIG. 2 is a block diagram illustrating an exemplary embodiment of a mobile terminal configured for video telephony.

FIG. 2 is a block diagram illustrating an exemplary embodiment of a mobile terminal 10A configured for video telephony. Mobile terminal 10A may be equipped to preemptively resend call setup packets, such as NSRP packets, when space is available in the modem layer, as described herein. In the example embodiment of FIG. 2, mobile terminal 10A includes a video CODEC 18, an audio CODEC 20, an H.245 control layer module 22, an H.223 multiplexer-demultiplexer (MUX-DEMUX) layer module 24, a modem 26, a transmit-receive (TX/RX) interface 27, and a control channel segmentation and reassembly layer (CCSRL)-NSRP module 28. Together, these components form the H.324M protocol stack. In general, many aspects of the preemptive resend technique described herein may be implemented in modem 26 of mobile terminal 10A.

Video CODEC 18 encodes video data obtained from a video input device, such as a camera or video archive source, according to an industry standard video compression protocol such as MPEG-4 or ITU H.263, for transmission to another mobile terminal. In addition, video CODEC 18 decodes video data received from another mobile terminal for output on a video output device, such as a display. Similarly, audio CODEC 20 encodes audio data received from an audio input device, such as a microphone or audio archive source, according to an audio compression protocol such as AAC (Advanced Audio Coding), AMR (Adaptive Multi-Rate), or QCELP (Qualcomm Code Excited Linear Predictive). Audio CODEC 20 also decodes audio data received from a remote terminal 10B for presentation by an audio output device, such as a built-in or external speaker associated with mobile terminal 10A.

H.245 control layer module 22 generates H.245 messages for transmission to a remote mobile terminal 10B for video call setup, and handles H.245 messages received from the remote mobile terminal. CCSRL-NSRP module 28 segments the H.245 messages from H.245 control layer module 22 into NSRP packets for transmission to the remote mobile terminal, and reassembles received NSRP packets into H.245 messages for handling by H.245 control layer module 22. Hence, the H.245 call control messages may be divided into segments for NSRP packetization. In general, video CODEC 18, audio CODEC 20 and H.245 control layer module 22 reside within an adaptation layer of mobile terminal 10A, and pass respective packets to the H.223 MUX-DEMUX layer module 24.

H.223 MUX-DEMUX layer module 24 multiplexes packets received from video CODEC 18, audio CODEC 20 and H.245 control layer module 22 into MUX protocol data units (PDUs), and passes the MUX PDUs to modem 26 for modulation and transmission to the remote mobile terminal 10B via TX/RX interface 27. TX/RX interface 27 includes a wireless transmitter and wireless receiver configured for wireless communication according to any of a variety of different communication techniques, such as code division multiple access (CDMA), wideband CDMA (WCDMA), time division multiple access (TDMA), or frequency division multiple access (FDMA), for communication over a wireless communication channel.

Modem 26 may segment and encapsulate the MUX PDUs in ISDN packets, which are then transmitted by TX/RX interface 27 in a series of radio link control (RLC) PDUs. Each MUX PDU passed by H.223 MUX/DEMUX module 24 carries NSRP packet information. Once call setup is complete, each MUX PDU will also include video and audio information. During call setup, however, there typically will be no video and audio information passed from the adaptation layer. Accordingly, each MUX PDU will contain predominantly NSRP packet information during call setup. H.223 MUX-DEMUX layer 24 also demultiplexes packets received from the remote mobile terminal 10B for processing by video CODEC 18, audio CODEC 20 and H.245 control layer module 22. Although video call setup techniques will be described herein in the context of 3G-H.324M, H.245, and H.223 for purposes of illustration, the techniques may be adapted to other established, emerging or future standards and protocols for mobile video telephony.

If the underlying wireless video telephony network in which mobile terminals 10A, 10B reside is error prone, a significant number of NSRP packets will be dropped, resulting in call setup delays due to the stop-and-wait aspect of a typical NSRP implementation. Specifically, a typical NSRP implementation generally requires that the sending mobile terminal 10A wait for an ACK packet from remote mobile terminal 10A before sending the next NSRP packet. In addition, in a typical NSRP implementation, NSRP packets are resent only upon expiration of a timeout period. In the example of FIG. 2, however, mobile terminal 10A resends NSRP packets containing H.245 messages when there is available bandwidth within modem 26. Hence, mobile terminal 10A resends the NSRP packet to remote mobile terminal 10B, without waiting for expiration of an NSRP timeout period.

In general, when remote mobile terminal 10B receives one of the call setup packets from mobile terminal 10A, the remote mobile terminal 10B sends an NSRP ACK packet to advise mobile terminal 10A that it received the call setup packet. In this manner, mobile terminal 10A knows that the call setup packet it sent has been received by remote mobile terminal 10B, and knows that it may continue the video call setup process by sending the next call setup packet. Until an ACK packet is received, however, mobile terminal 10A continues the preemptive resend process by resending NSRP packets when there is idle space available in the modem layer. Once an ACK packet is received, mobile terminal 10A terminates the resend process, and sends NSRP packets containing the next call setup message from the H.245 layer.

Although transmission of NSRP packets from mobile terminal 10A to remote mobile terminal 10B has been described, it should be understood that mobile terminal 10B also sends NSRP packets to mobile terminal 10A. Also, mobile terminal 10A sends NSRP ACK packets to remote mobile terminal 10B in response to received NSRP packets. Accordingly, a similar process of resending NSRP packets may be applied within both mobile terminal 10A and mobile terminal 10B.

In addition, in some embodiments, it may be desirable to resend ACK packets from a respective mobile terminal 10A, 10B in this manner. However, generation of ACK packets in response to the resent NSRP packets may provide sufficient reductions in call setup delay. In particular, rather than resending ACK packets for every NSRP packet, the likelihood of successful transmission of an ACK packet may be increased simply by the increased number of resent NSRP messages for which ACK packets must be generated and transmitted. Accordingly, in many cases, it may be sufficient to resend NSRP packets but not necessarily resend ACK packets.

In the examples of FIGS. 1 and 2, mobile terminals 10A and 10B may be wireless radiotelephones, or other wireless communication devices, equipped with video displays and appropriate video encoders/decoders (CODECs). The techniques described herein may be implemented within a general purpose microprocessor, digital signal processor (DSP), application specific integrated circuit (ASIC), field programmable gate array (FPGA), or other equivalent logic devices within a mobile terminal. Accordingly, various components, such as video CODEC 18, audio CODEC 20, H.245 control layer module 22, H.223 MUX-DEMUX layer module 24, and modem 26, may be implemented as fixed or programmable features executing within one or more logic devices. Various aspects of the techniques described herein may be implemented in hardware, software, firmware, or any combination thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like.

With further reference to FIG. 2, in a conventional implementation, modem 26 must transmit ISDN packets periodically to maintain a full channel, whether there is data to send from the H.223 layer or not. If there is no NSRP, audio or video information to send, modem 26 would ordinarily fill the ISDN packets, or idle portions thereof, with stuffing flags. In accordance with this disclosure, however, the idle portions of the ISDN packets are used to preemptively retransmit NSRP packets to the remote mobile terminal 10B, such that the NSRP packet information is substituted for the stuffing flags with the ISDN packets. In particular, modem 26 is configured to locally buffer ISDN packets containing H.223 information and then retransmit the buffered packets in place of idle ISDN packets that would normally include only stuffing flags.

Figure 3:
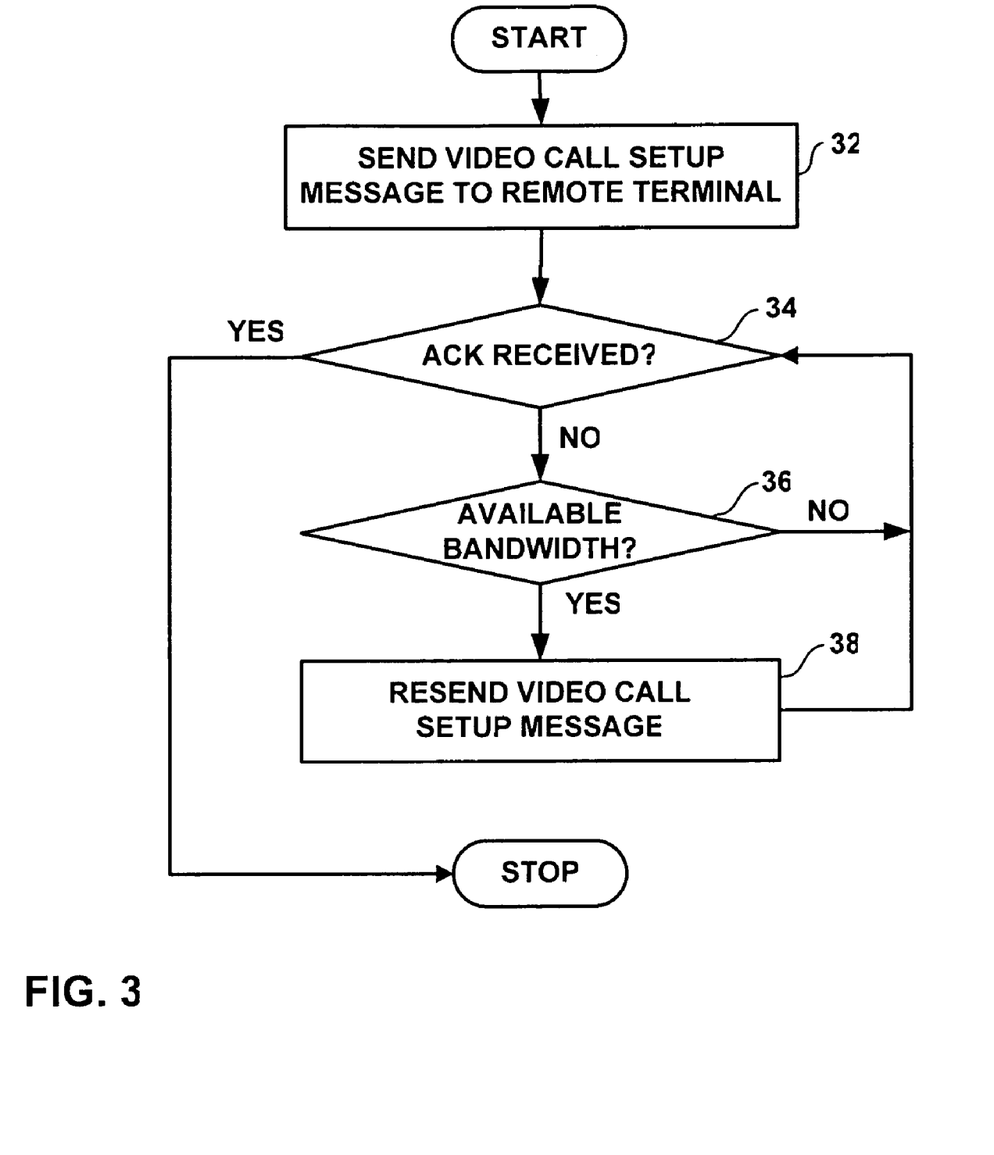
FIG. 3 is a flow diagram illustrating a video call setup technique.

FIG. 3 is a flow diagram illustrating a video call setup process in accordance with this disclosure. The video call setup process may be implemented within a mobile terminal 10A, 10B as shown in FIGS. 1 and 2. Upon initiation of a video call, sending mobile terminal 10A sends a call setup message to remote mobile terminal 10B (32). Again, the call setup message may include an H.245 control message generated within H.245 control module 22. The H.245 control message is ultimately segmented into NSRP packets within CCSRL NSRP module 28, into MUX PDUs at H.223 MUX-DEMUX layer module 24, and into ISDN packets at modem 26 for transmission via TX/RX interface 27. Once an NSRP acknowledgement (ACK) packet has been received from the remote mobile terminal 10B (34), the sending mobile terminal 10A does not resend the call setup message. Instead, sending mobile terminal 10A stops and waits for the next call setup message to be generated, e.g., by H.245 control layer module 22. NSRP ACK packets are processed in the upper layers of the H.324M protocol stack, e.g., within CCSRL NSRP module 28. Accordingly, modem 26 stop retransmission in response to a stop command received from the H.324M protocol stack.

Until an ACK packet is received (34), however, sending mobile terminal 10A seeks to preemptively resend the call setup message, which may involve retransmission of one or more NSRP packets. If there is available bandwidth at the modem layer (36), modem 26 resends the call setup message (38). For example, if modem 26 has received no new NSRP packets or audio or video information from the H.223 layer, the modem adds the previously sent NSRP packets into one or more newly transmitted ISDN packets, instead of simply placing idle stuffing flags in the ISDN packets. In particular, modem 26 may locally buffer and retrieve ISDN packets containing NSRP packet information for retransmission during idle periods. In this manner, the NSRP packets are resent using available bandwidth that otherwise would be wasted.

As will be described, previously sent ISDN packets can be buffered by modem 26 to support efficient retransmission of NSRP information. In particular, each ISDN packet may be buffered upon transmission and then retrieved from the buffer for retransmission when idle bandwidth exists. The buffering of ISDN packets avoids the need to regenerate each call setup message from the H.245 layer control module 22, as well as resegmentation to produce each NSRP packet within CCSRL NSRP module 28, and regeneration of the MUX PDU at the H.223 layer. Rather than regenerating this information and passing it to the modem layer, modem 26 simply stores the ISDN packets in a local buffer and retrieves them for retransmission, thereby reducing retransmission overhead.

Figure 4:
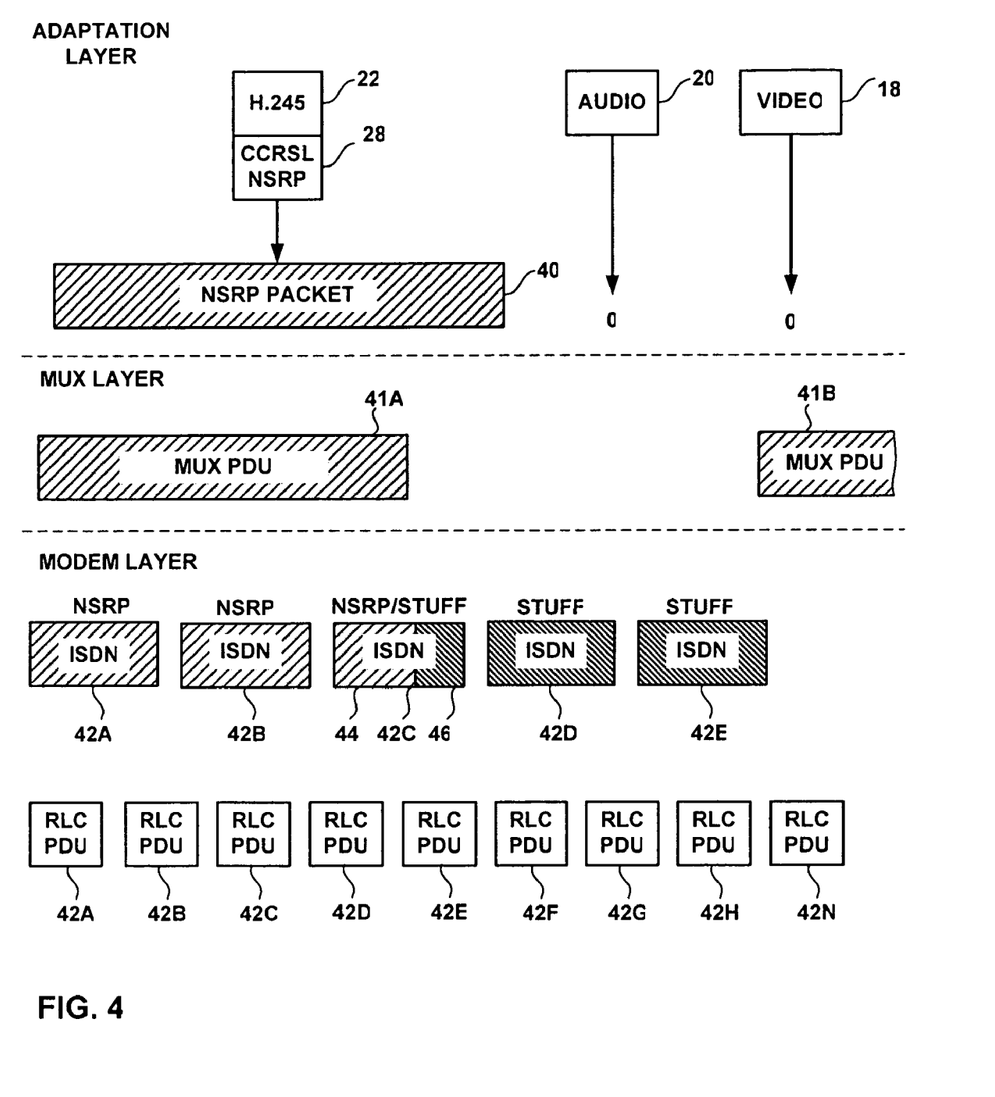
FIG. 4 is a block diagram illustrating assembly of video call setup packets for communication to a remote mobile terminal.

FIG. 4 is a block diagram illustrating assembly of video call setup packets within sending mobile terminal 10A for communication to a remote mobile terminal 10B. As shown in FIG. 4, during call setup, the adaptation layer produces only NSRP packets 40. In particular, H.245 control layer module 22 generates call setup messages that are segmented by CCSRL-NSRP layer module 28 into NSRP packets, as represented by NSRP packet 40. During call setup, a video teleconference has not yet been established. Accordingly, video CODEC 18 and audio CODEC 20 do not generate any video or audio information. Consequently, MUX-DEMUX layer (e.g., H.223) receives only NSRP packet 40 from the adaptation layer.

MUX-DEMUX layer module 24 segments each NSRP packet 40 and distributes the segments over successive MUX PDUs 41A, 41B. Modem 26 then distributes each MUX PDU 41 over a series of ISDN packets and, in turn, a series of RLC PDUs to be passed to TX/RX interface 27 for transmission. In the example of FIG. 4, NSRP packets form substantially the entire payload of the first two ISDN packets 42A, 42B, and a portion of the payload of the third ISDN packet 42C. The third ISDN packet 42C includes a first portion 44 containing NSRP packet information, and a second, idle portion 46 containing only stuffing (STUFF) bits.

If there is no additional information available from the adaptation layer, the additional ISDN packets, such as ISDN packets 42D, 42E, which must be sent periodically by modem 26, ordinarily would contain only stuffing flags (STUFF) as the payload. In accordance with this disclosure, however, ISDN packets containing stuffing flags can be replaced by buffered ISDN packets containing previously sent NSRP packet information to permit efficient retransmission. As further shown in FIG. 4, ISDN packets 42 are further segmented into RLC PDUs 48A-48N for transmission via TX/RX interface 27.

Figure 5:
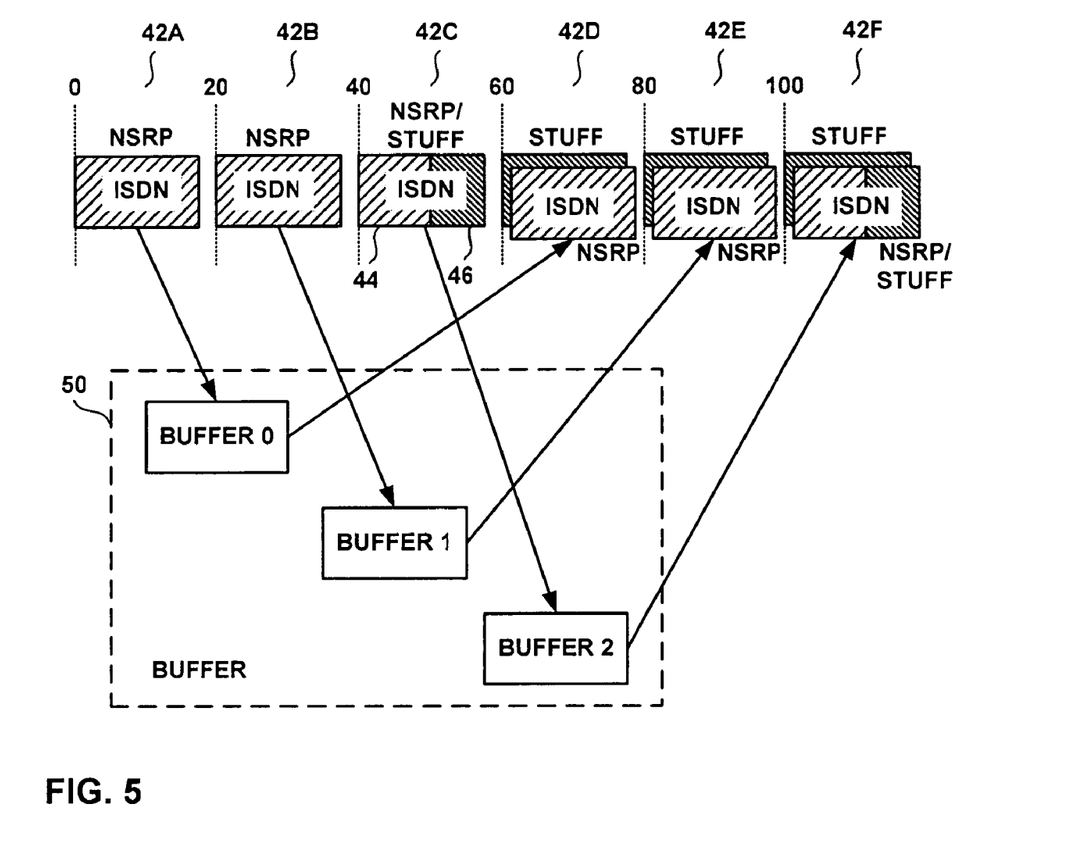
FIG. 5 is a block diagram illustrating a technique for retransmitting video call setup packets to reduce setup delays.

FIG. 5 is a block diagram illustrating a technique for retransmitting video call setup packets to reduce video call setup delays in further detail. In particular, FIG. 5 shows the buffering and retrieval of ISDN packets at the modem layer within a mobile terminal 10A to support efficient retransmission of NSRP packets to a remote mobile terminal 10B. MUX-DEMUX layer module 24 passes MUX PDUs to modem 26. Modem 26 generates an ISDN packet for transmission every twenty milliseconds (ms). The first two ISDN packets 42A, 42B contain predominantly NSRP packet information, while a third ISDN packet contains NSRP packet information 44 and stuffing flags 46. The stuffing flags 46 are included in third ISDN packet 42C because the remaining NSRP packet information from the MUX-DEMUX layer module 24 is insufficient to fill the entire payload of the MUX PDU, resulting in idle bandwidth. The idle bandwidth may result during call setup due to a gap between successive NSRP packets, and the absence of any video or audio information.

Importantly, as each ISDN packet 42A-42C is sent, a copy of the respective ISDN packet is stored by modem 26 in a local buffer 50 at the modem layer. For example, ISDN packets 42A, 42B, and 42C are stored in buffer 50 at Buffer Location 0, Buffer Location 1 and Buffer Location 2, respectively. A greater or lesser number of buffer locations may be used depending on the number of ISDN packets to be stored. When modem 26 has no further data to send, it is still required to send ISDN packets every 20 ms to maintain a full channel. For example, modem 26 may be required to send an ISDN packet having 160 bytes of data to TX/RX interface 27 every 20 ms. Ordinarily, in the absence of NSRP, video, or audio data, MUX-DEMUX layer module 24 will provide modem 26 with no additional data at the time the next ISDN packet is scheduled. In this case, modem 26 would send "idle" ISDN packets 42D, 42E, or 42F filled with stuffing flags.

In accordance with this disclosure, however, modem 26 replaces the idle ISDN packets 42D, 42E, or 42F with buffered ISDN packets 42A, 42B, 42C containing the previously transmitted NSRP packet information. In particular, modem 26 retrieves the stored ISDN packets 42A, 42B, 42C from Buffer Locations 0-2 in buffer 50, and resends those ISDN packets in place of ISDN packets 42D-42F. Local storage of ISDN packets 42A, 42B, 42C within buffer 50 avoids the need to regenerate the H.245 messages and NSRP packets in the upper layers of the H.324M protocol stack. Instead, modem 26 fills the 160 idle bytes with a saved ISDN packet containing NSRP packet information from buffer 50, rather than stuffing flags. TX/RX interface 27 then transmits RLC PDUs containing NSRP control packet information that was previously transmitted.

In this manner, the H.245 call control messages carried by NSRP packets in the stored ISDN packets 42A, 42B, 42C are retransmitted to the remote mobile terminal 10B. Thus, even if the underlying network is error-prone and a previous transmission of an NSRP control packet was lost, the NSRP control packet is preemptively retransmitted without having to wait for an NSRP ACK packet or a time-out. Modem 26 may continue to retransmit the buffered ISDN packets 42A, 42B, 42C in place of idle ISDN packets 42D, 42E, 42F until a stop command is received from the application layer. The stop command may be generated when the sending mobile terminal 10A receives an NSRP ACK packet from the remote mobile terminal 10B. Alternatively, the stop command may be generated when the NSRP timeout period expires and a new NSRP packet is produced in the adaptation layer for retransmission. As a further alternative, modem 26 may be configured to perform only a selected number of resend attempts.

When remote mobile terminal 10B receives the call setup packet, either from the initial transmission or a subsequent retransmission, it transmits an ACK packet back to the sending mobile terminal 10A. Modem 26 receives the ACK packet and passes it up the protocol stack to the application layer. The application layer recognizes the packet as an ACK packet and understands that the remote mobile terminal 10B has received the call setup packet sent by mobile terminal 10A. In response, the application layer passes an out-of-band control message down the protocol stack to modem 26 with a stop command instructing the modem to stop retransmission of the NSRP packet information and flush buffer 50. Once the call setup packet is received by remote mobile terminal 10B, there is no need to retransmit the call setup packet. The adaptation layer then generates the next NSRP packet, if necessary, in a series of NSRP packets needed for call setup.

Figure 6:
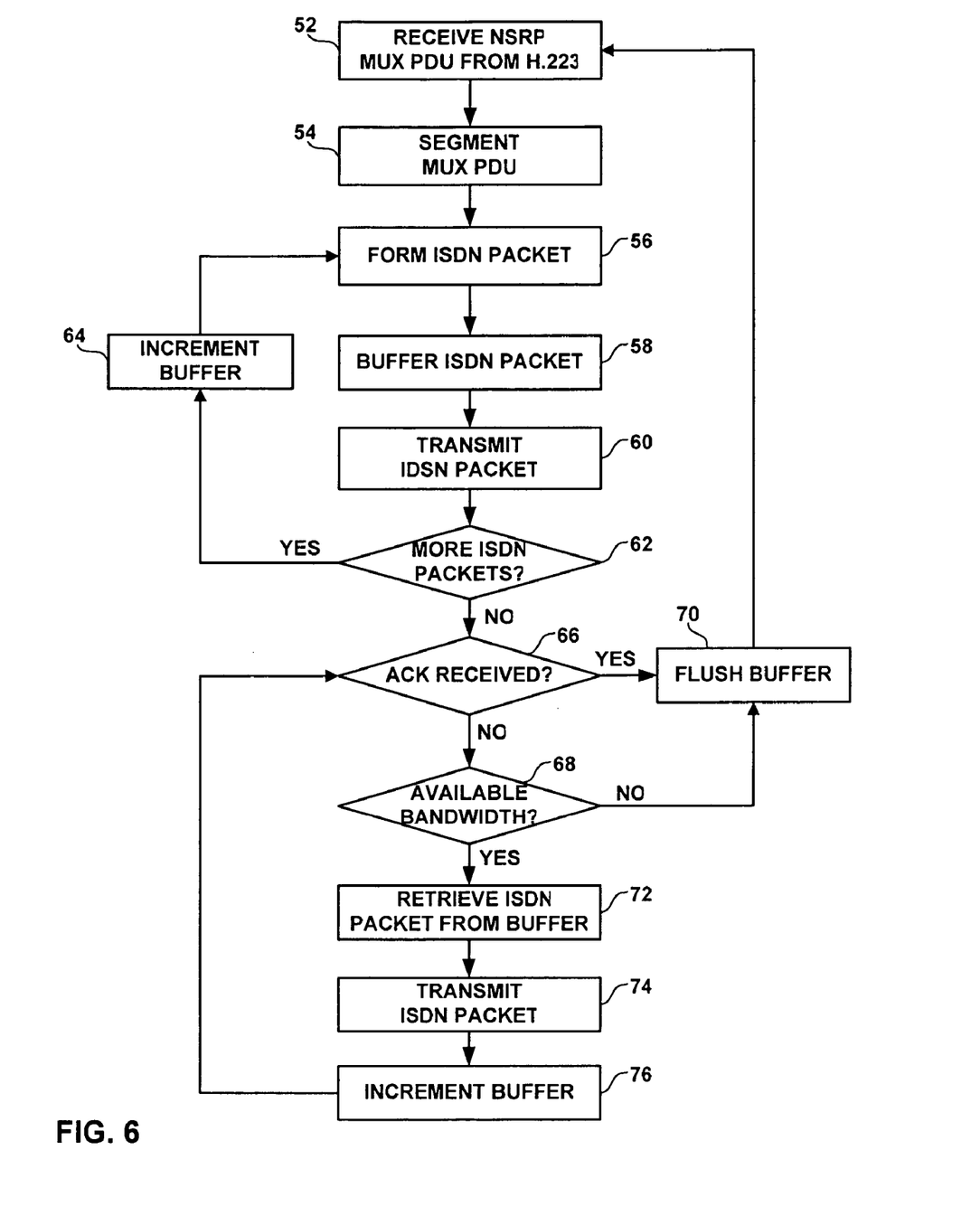
FIG. 6 is a flow diagram illustrating assembly and retransmission of video call setup packets in greater detail.

FIG. 6 is a flow diagram illustrating assembly and retransmission of video call setup packets in greater detail. As shown in FIG. 6, upon receipt of a MUX PDU containing NSRP information (52) from the H.223 MUX-DEMUX module 24, modem 26 segments the MUX PDU (54) and generates an ISDN packet (56) containing the MUX PDU segment. Modem 26 then buffers the ISDN packet (58) in local buffer 50, and transmits the ISDN packet (60) to the remote mobile terminal 10B via TX/RX interface 27. If there are more ISDN packets to be sent (62), modem 26 increments the buffer 50 to the next storage location (64), and repeats steps (56)-(62) to form and transmit the next ISDN packet.

Once the last ISDN packet is processed (62) for a MUX PDU, modem 26 proceeds to determine whether an NSRP ACK packet has been received (66) from the remote mobile terminal 10A. If so, modem 26 flushes buffer 50 and returns to process the next MUX PDU, if any, from the adaptation layer (52). Notably, modem 26 may not directly determine whether an NSRP ACK packet is received. Rather, processing of NSRP ACK packets ordinarily will be handled by H.245 control module 22. Instead, an indication that an NSRP ACK packet is received may result from an out-of-band stop command passed down from the adaptation layer upon reassembly and inspection of packets received from remote mobile terminal 10B.

If an ACK packet has not been received (66), modem 26 determines whether there is available bandwidth (68) in the next ISDN Packet, i.e., whether the next ISDN packet will be filled with stuffing flags or will contain new NSRP information from a pending MUX PDU. If there is idle bandwidth within the next ISDN packet, modem 26 retrieves the ISDN packet stored in the first Buffer Location 0 (72), and passes that ISDN packet to the physical layer for transmission (74). In this manner, the stored ISDN packet and its NSRP contents are resent to the remote mobile terminal 10B.

Upon transmitting the stored ISDN packet (74), modem 26 increments the buffer location (76) in buffer 50 and determines again whether an NSRP ACK packet has been received (66). If so, there is no need for further resend attempts. In this case, modem 26 flushes buffer 50, and returns to step (52). If an NSRP ACK packet has not been received (66), e.g., no stop command has been received from the adaptation layer, modem 26 proceeds through steps (68) and (72)-(76). In particular, modem 26 replaces the next ISDN packet with a buffered ISDN packet at the next buffer location in order to provide a retransmission of the NSRP packet information. This process continues until a stop command is received from the adaptation layer, in which case modem 26 processes the next new MUX PDU and continues with the call setup process.

During the call setup process, mobile terminal 10A and remote mobile terminal 10B operate reciprocally in exchanging NSRP packets and ACK packets. Accordingly, remote mobile terminal 10B may implement a resend process similar to that of sending mobile terminal 10A for transmission of NSRP packets. Also, in some embodiments, mobile terminals 10A, 10B may implement a similar resend process for NSRP ACK packets. In this case, mobile terminals 10A, 10B may use a smarter buffering strategy. In particular, instead of retransmitting only the last packet sent by modem 26, the modem can use the information received from the adaptation layer to intelligently retransmit the packets. For example, instead of simply retransmitting the most recent data received from the adaptation layer, modem 26 may be configured to alternately repeat the retransmission of NSRP packets and NSRP ACK packets. Repeating both the NSRP ACK packets and the NSRP packets may support further reductions in video call setup time.

Further, in some embodiments, mobile terminals 10A, 10B may be configured to detect whether the opposite mobile terminal has implemented that same preemptive resend process for NSRP packets. For example, mobile terminal 10B may detect whether mobile terminal 10A has implemented the preemptive resend process by detecting whether mobile terminal 10A is immediately repeating the transmission of the last NSRP packet sent. Detection of the use of the resend technique by the remote mobile terminal 10B may be performed within the adaptation layer, and then signaled to modem 26 via an out-of-band command. If both mobile terminals use this technique, then it may be unnecessary to repeat the transmission of NSRP ACK packets as described above.

Instead, in this situation, mobile terminals 10A, 10B may be configured to simply retransmit the NSRP packets that carry the H.245 call control messages. Since, in this case, both mobile terminals 10A, 10B will be repeating NSRP messages aggressively, the ACK packets will be generated automatically each time an NSRP packet is received. Accordingly, additionally resending each ACK packet may present little additional value in terms of reducing call setup delays. If a mobile terminal 10A determines that a remote mobile terminal 10B is not using a preemptive resend technique for NSRP packets, it may be desirable for the sending mobile terminal 10A to retransmit the NSRP ACK packets in addition to the NSRP call setup packets.

By resending ISDN packets containing NSRP packet information, a mobile terminal 10A can significantly reduce call setup delay. As mentioned above, according to some protocols, a MUX PDU must be sent every 20 ms. The techniques described herein permit a buffered ISDN packet containing NSRP packet information to be retransmitted from the modem layer as often as every 20 ms, instead of first having to be regenerated in the upper layers in the protocol stack, and then resegmented and remultiplexed in the MUX-DEMUX layer.

Table 1 shows an example of how a preemptive retransmission process, as described herein, might take place in the modem layer. Table 1 illustrates a situation in which a modem is intelligently retransmitting ISDN packets that contain NSRP packet information, instead of merely retransmitting the most recently transmitted ISDN packet. In particular, modem 26 tracks and stores the ISDN packets containing NSRP packet information, and then retrieves them sequentially from the local buffer 50 for retransmission when idle bandwidth is available, i.e., when a transmitted ISDN packet would otherwise be filled by stuffing flags.

TABLE 1

| Time (ms) | Data received from H.223 Layer (bytes) | Modem Layer Action |
| --- | --- | --- |
| 0 | 160 | Send 160 bytes; save this 160 bytes to buffer location 0 |
| 20 | 160 | Send 160 bytes; save this 160 bytes to buffer location 1 |
| 40 | 100 | Add stuffing of another 60 bytes; send out 160 bytes; save this 160 bytes to buffer location 2 |
| 60 | 0 | Send data from backup buffer, starting at buffer location 0 |
| 80 | 0 | Send data from buffer location 1 |
| 100 | 0 | Send data from buffer location 2 |
| 120 | 0 | Send data from buffer location 0 |
| 140 | 160 | Send out 160 bytes, flush buffers [0...n], save this 160 bytes to buffer location 0 |

Table 1 illustrates the data received by modem 26 from the H.223 MUX-DEMUX layer, and the corresponding action taken by modem 26 for transmission of a 160-byte ISDN packet every 20 ms. In Table 1, the amount of data received from the H.223 MUX-X DEMUX layer is expressed in bytes. As illustrated in Table 1, at 0 ms, modem 26 receives 160 bytes of NSRP packet information in a MUX PDU from the H.223 layer. In response, modem 26 packs the 160 bytes of NSRP packet information into an ISDN packet, and sends the ISDN packet. In addition, modem 26 saves this 160-byte ISDN packet to buffer location 0.

At 20 ms, modem 26 receives another 160 bytes of NSRP packet information in MUX PDU from the H.223 layer, again sends a 160-byte ISDN packet containing the NRSP packet information, and stores this ISDN packet in buffer location 1. At 40 ms, modem 26 receives only 100 bytes of NSRP packet information in a MUX PDU from the H.223 layer. In this case, modem 26 packs an ISDN packet with the 100 NSRP bytes and 60 bytes of stuffing flags, sends the resulting ISDN packet and stores the ISDN packet in buffer-location 2. At 60 ms, modem 26 receives no bytes from the H.223 layer, which may represent a gap between NSRP packets at the adaptation layer. Ordinarily, modem 26 would fill the next ISDN packet entirely with stuffing flags. In accordance with this disclosure, however, modem 26 retrieves the previously transmitted ISDN packet from buffer location 0 and resends the retrieved ISDN packet.

Likewise, at 80 ms and 100 ms, when no further data is received from the H.223 layer, modem 26 retrieves the next ISDN packets from buffer locations 1 and 2, respectively, and resends the retrieved ISDN packets. At 120 ms, when no further data is received from the H.223 layer, modem 26 starts again at buffer location 0, and retrieves and resends the ISDN packet stored in that location. At 140 ms, however, modem 26 receives another 160 bytes of NSRP packet information in a MUX PDU. In this case, modem 26 also may receive a stop command from the application layer, e.g., in response to an NSRP ACK timeout or receipt of an ACK command, each of which are processed in the H.245 layer module 22 rather than in modem 26.

The newly received NSRP packet information may result from regeneration of the previously sent NSRP packet information in the H.245 layer following expiration of an NSRP ACK timeout. Alternatively, the newly received NSRP packet information may result from the generation of new NSRP data, containing the next H.245 messages in the call setup process, following receipt of an NSRP ACK from the remote mobile terminal 10B. In either case, when new NSRP packet data is received from the H.223 layer, modem 26 sends the NSRP packet data from the received MUX PDU in the 160-byte ISDN packet, and flushes the buffer to provide room for storage of the new ISDN packet.

The preemptive retransmission process may continue until the video call setup is complete. It is important to note that this process of retransmitting NSRP packets and, optionally, NSRP ACK packets generally will be used only during the call setup process, as this technique may not work when audio or video from the adaptation layer is being transmitted. Modem 26 may receive a command from the upper layers to flush its buffers once the video protocols are established and audio or video media transmission has begun.

The techniques described herein may be highly effective in reducing video call setup delay, in comparison to conventional techniques that rely on standard NSRP process. For example, in a standard NSRP implementation, regardless of the actual NSRP time-out value, there will be a gap if one NSRP message is dropped, contributing to a call setup delay. If the underlying network is error prone, potential delays can become worse due to the increased number of NSRP packets dropped. One way to remedy this would be to lower the NSRP time-out value to minimize the time gap due to a dropped NSRP packet. This solution, however, may result in degraded performance, due to the amount of overhead required in the H.324 layer such as multiplexing, extra code, and the complexity of handling NSRP retransmission in the H.324 layer.

Another drawback of such an approach is the amount of overhead required to retransmit an NSRP packet after a timeout. In particular, when the NSRP timer expires and the H.324 stack starts retransmission of an NSRP packet, the NSRP packet must be regenerated and multiplexed again to be sent back down the lower modem layer for retransmission. That is, the NSRP packet goes through the multiplex layer (H.223) to be turned into H.223 MUX PDUs, which are then sent to the modem layer to wait for the next transmission.

In general, the preemptive resend techniques described herein involve retransmission by a mobile terminal of NSRP packets whenever the lower modem layer has nothing to send. Instead of waiting for an NSRP acknowledgement (ACK) packet from a remote mobile terminal, or the expiration of a timeout value, the mobile terminal continues to retransmit an NSRP packet when there is space available in the modem layer and it is time for the modem to send out a transmission. This approach alleviates the shortcomings of the "stop and wait" nature of NSRP by reducing the time to retransmit the last packet.

Hence, the techniques described in this disclosure modify the behavior of the mobile terminal. Instead of sending out stuffing flags when there is no call setup data available to send out from the upper layer, the mobile terminal instead uses this space to send out previous useful information, i.e., a previously sent NSRP packet, directly through the modem. In this manner, the mobile terminal need not wait for expiration of an NSRP time-out value. Rather, the mobile terminal retransmits the previously sent NSRP packet, potentially multiple times, until an NSRP ACK packet is received. The transmitted NSRP packet is saved at a buffer at the modem layer, and can be retrieved from the buffer for retransmission, rather than recreated in the H.324M upper layer, thereby reducing complexity of the H.324M stack handling.

Various embodiments have been described. These and other embodiments are within the scope of the following claims.

The invention claimed is:

1. A method comprising:
   transmitting a video call setup packet from a first mobile terminal to a second mobile terminal;
   storing the video call setup packet in a buffer associated with a modem layer in the first mobile terminal;
   filling an idle packet at the modem layer with stuffing flags for transmission to the second mobile terminal during an idle period of the first mobile terminal;
   when an acknowledgment packet for the video call setup packet has not been received from the second mobile terminal, replacing the idle packet with the stored video call setup packet, wherein the stored video call setup packet is retrieved from the buffer at the modem layer without regenerating the packet; and
   preemptively retransmitting the stored video call setup packet, instead of the idle packet, from the first mobile terminal to the second mobile terminal during the idle period of the first mobile terminal without waiting for expiration of a timeout period for receipt of an acknowledgement packet from the second mobile terminal.

2. The method of claim 1, wherein storing the video call setup packet includes storing a plurality of video call setup packets transmitted by the first mobile terminal.

3. The method of claim 2, wherein the video call setup packets include integrated services digital network (ISDN) packets comprising numbered simple retransmit protocol (NSRP) packet information, and wherein the NSRP packet information comprises ITU H.245 call control messages.

4. The method of claim 2, wherein retransmitting includes:
retrieving a first video call setup packet from the buffer;
transmitting the first video call setup packet;
retrieving a second video call setup packet from the buffer; and
transmitting the second video call setup packet.

5. The method of claim 1, wherein retransmitting includes retransmitting the video call setup packet when there is idle bandwidth available within a packet to be transmitted by the first mobile terminal.

6. The method of claim 1, wherein retransmitting includes retransmitting the video call setup packet when a modem of the mobile terminal detects idle bandwidth in a packet generated by the modem.

7. The method of claim 1, further comprising repeating the retransmission of the video call setup packet, and terminating the repeated retransmission of the call setup packet upon receipt of the acknowledgement packet from the second mobile terminal.

8. The method of claim 1, further comprising repeating the retransmission of the video call setup packet, and terminating the retransmission of the video call setup packet upon commencement of a video call or receipt of a stop command.

9. The method of claim 1, further comprising:
transmitting acknowledgement packets to the second mobile terminal in reply to video call setup packets received from the second mobile terminal;
determining whether the second mobile terminal is retransmitting the video call setup packets; and
retransmitting at least some of the acknowledgement packets to the second mobile terminal.

10. The method of claim 9, wherein retransmitting at least some of the acknowledgement packets includes retransmitting the acknowledgement packets if the second mobile terminal is not retransmitting the video call setup packets.

11. The method of claim 1, wherein the video call setup packets comprise ITU H.245 call setup information for setup of ITU H.324M videoconferencing.

12. The method of claim 1, wherein the idle period is a period of time during which the modem layer of the first mobile terminal has received no new information from a protocol stack.

13. The method of claim 12, wherein the protocol stack is a mobile video telephony protocol stack.

14. The method of claim 1, wherein, if a portion of the video call setup packet does not include any information, the method further comprises filling the portion of the video call setup packet with stuffing flags.

15. The method of claim 14, further comprising storing the video call setup packet with the portion containing the stuffing flags in a buffer associated with the modem layer in the first mobile terminal, wherein retransmitting includes retrieving the video call setup packet with the portion containing the stuffing flags from the buffer at the modem layer and transmitting the retrieved video call setup packet with the portion containing the stuffing flags to the second mobile terminal.

16. The method of claim 1, further comprising incrementing a buffer location in the buffer after retransmitting the video call setup packet.

17. A wireless mobile terminal comprising:
a wireless transmitter configured to transmit a video call setup packet from a first mobile terminal to a second mobile terminal;
a wireless receiver; and
a modem configured to:
generate the video call setup packet for transmission to the second mobile terminal via the transmitter;
store the video call setup packet in a buffer associated with a modem layer in the first mobile terminal;
fill an idle packet at the modem layer with stuffing flags for transmission to the second mobile terminal during an idle period of the first mobile terminal;
when an acknowledgment packet for the video call setup packet has not been received from the second mobile terminal, replace the idle packet with the stored video call setup packet, wherein the stored video call setup packet is retrieved from the buffer at the modem layer without regenerating the packet; and
preemptively submit the stored video call setup packet, instead of the idle packet, for retransmission via the transmitter to the second mobile terminal during the idle period of the wireless mobile terminal without waiting for expiration of a timeout period for receipt of an acknowledgement packet from the second mobile terminal.

18. The mobile terminal of claim 17, wherein the modem stores a plurality of the video call setup packets in the buffer.

19. The mobile terminal of claim 18, wherein the video call setup packets include integrated services digital network (ISDN) packets comprising numbered simple retransmit protocol (NSRP) packet information, and wherein the NSRP packet information comprises ITU H.245 call control messages.

20. The mobile terminal of claim 18, wherein the modem is configured to:
retrieve a first video call setup packet from the buffer;
submit the first video call setup packet for retransmission via the transmitter;
retrieve a second video call setup packet from the buffer; and
submit the second video call setup packet for retransmission via the transmitter.

21. The mobile terminal of claim 17, wherein the modem is configured to submit the video call setup packet for retransmission via the transmitter when there is idle bandwidth available within a packet to be transmitted by the first mobile terminal.

22. The mobile terminal of claim 17, wherein the modem is configured to repeat the submission of the video call setup packet for retransmission, and terminate the retransmission of the video call setup packet upon receipt of the acknowledgement packet from the second mobile terminal.

23. The mobile terminal of claim 17, wherein the modem is configured to repeat the submission of the video call setup packet for retransmission, and wherein the modem terminates the retransmission of the video call setup packet upon commencement of a video call or receipt of a stop command.

24. The mobile terminal of claim 17, wherein the modem is configured to submit acknowledgement packets for transmission to the second mobile terminal in reply to the video call setup packets received from the second mobile terminal.

25. The mobile terminal of claim 24, wherein the modem is configured to retransmit at least some of the acknowledgement packets if the second mobile terminal is not retransmitting the video call setup packets.

26. The mobile terminal of claim 17, wherein the video call setup packets comprise ITU H.245 call setup information for setup of ITU H.324M videoconferencing.

27. The mobile terminal of claim 17, wherein the idle period is a period of time during which the modem layer of the wireless mobile terminal has received no new information from a protocol stack.

28. The mobile terminal of claim 27, wherein the protocol stack is a mobile video telephony protocol stack.

29. The mobile terminal of claim 17, wherein, if a portion of the video call setup packet does not include any information, the modem is configured to fill the portion of the video call setup packet with stuffing flags.

30. The mobile terminal of claim 29, wherein the modem is configured to store the video call setup packet with the portion containing the stuffing flags in a buffer associated with the modem layer, retrieve the video call setup packet with the portion containing the stuffing flags from the buffer at the modem layer, and submit the retrieved video call setup packet with the portion containing the stuffing flags for retransmission to the second mobile terminal via the transmitter.

31. The mobile terminal of claim 17, wherein the modem is further configured to increment a buffer location in the buffer after submitting the video call setup packet for retransmission.

32. A non-transitory computer-readable medium comprising instructions to cause a processor to:
transmit a video call setup packet from a first mobile terminal to a second mobile terminal;
store the video call setup packet in a buffer associated with a modem layer in the first mobile terminal;
fill an idle packet at the modem layer with stuffing flags for transmission to the second mobile terminal during an idle period of the first mobile terminal;
when an acknowledgment packet for the video call setup packet has not been received from the second mobile terminal, replace the idle packet with the stored video call setup packet, wherein the stored video call setup packet is retrieved from the buffer at the modem layer without regenerating the packet; and
preemptively retransmit the stored video call setup packet, instead of the idle packet, from the first mobile terminal to the second mobile terminal during the idle period of the first mobile terminal without waiting for expiration of a timeout period for receipt of an acknowledgement packet from the second mobile terminal.

33. The non-transitory computer-readable medium of claim 32, wherein the instructions cause the processor to store a plurality of video call setup packets transmitted by the first mobile terminal in the buffer.

34. The non-transitory computer-readable medium of claim 33, wherein the video call setup packets include integrated services digital network (ISDN) packets comprising numbered simple retransmit protocol (NSRP) packet information, and wherein the NSRP packet information comprises ITU H.245 call control messages.

35. The non-transitory computer-readable medium of claim 33, wherein the instructions cause the processor to:
retrieve a first video call setup packet from the buffer;
transmit the first video call setup packet;
retrieve a second video call setup packet from the buffer; and
transmit the second video call setup packet.

36. The non-transitory computer-readable medium of claim 32, wherein the instructions cause the processor to retransmit the video call setup packet when a modem of the mobile terminal detects idle bandwidth in a packet generated by the modem.

37. The non-transitory computer-readable medium of claim 32, wherein the video call setup packets comprise ITU H.245 call setup information for setup of ITU H.324M videoconferencing.

38. A wireless mobile terminal comprising:
a wireless transmitter;
a wireless receiver;
a video coder-decoder (CODEC) to generate video information;
an audio CODEC to generate audio information;
a processor that includes:
an ITU H.245 control layer module to generate video call setup packets;
a numbered simple retransmit protocol (NSRP) module to generate one or more NSRP packets based on the video call setup packets; and
an ITU H.223 layer module to multiplex the video information, audio information, and NSRP packets to produce one or more multiplexed protocol data units (MUX PDUs); and
a modem to:
generate one or more MUX PDU integrated services digital network (ISDN) packets based on the MUX PDUs for transmission to a second mobile terminal via the transmitter;
store the one or more MUX PDU ISDN packets in a buffer associated with a modem layer in the wireless mobile terminal;
fill one or more idle ISDN packets at the modem layer with stuffing flags for transmission to a second mobile terminal during an idle period of the wireless mobile terminal;
when an acknowledgment packet for the one or more of the MUX PDU ISDN packets has not been received from the second mobile terminal, replace the one or more idle ISDN packets with the stored one or more MUX PDU ISDN packets, wherein the stored MUX PDU ISDN packets are retrieved from the buffer at the modem layer without regenerating the packets; and
preemptively submit the stored one or more MUX PDU ISDN packets, instead of the one or more idle ISDN packets, for retransmission via the transmitter to the second mobile terminal during the idle period of the wireless mobile terminal without waiting for expiration of a timeout period for receipt of an acknowledgement packet from the second mobile terminal via the wireless receiver.

39. The mobile terminal of claim 38, wherein the modem is configured to submit the retrieved MUX PDU ISDN packets for retransmission via the transmitter when there is idle bandwidth available within a packet to be transmitted by the wireless mobile terminal.

40. The mobile terminal of claim 38, wherein the modem is configured to repeat the submission of the MUX PDU ISDN packets for retransmission, and terminate the retransmission of the MUX PDU ISDN packets upon receipt of the acknowledgement packet from the second mobile terminal.

41. The mobile terminal of claim 38, wherein the modem is configured to repeat the submission of the MUX PDU ISDN packets for retransmission, and wherein the modem terminates the retransmission of the MUX PDU ISDN packets upon commencement of video transmission or receipt of a stop command.

42. An apparatus for videoconferencing, comprising:
means for transmitting a video call setup packet from a first mobile terminal to a second mobile terminal;
means for storing the video call setup packet in a buffer associated with a modem layer in the first mobile terminal;
means for filling an idle packet at the modem layer with stuffing flags for transmission to the second mobile terminal during an idle period of the first mobile terminal;
when an acknowledgment packet for the video call setup packet has not been received from the second mobile terminal, means for replacing the idle packet with the stored video call setup packet, wherein the stored video call setup packet is retrieved from the buffer at the modem layer without regenerating the packet; and
means for preemptively retransmitting the stored video call setup packet, instead of the idle packet, from the first mobile terminal to the second mobile terminal during the idle period of the first mobile terminal without waiting for expiration of a timeout period for receipt of an acknowledgement packet from the second mobile terminal.

* * * * *